United States Patent [19]

Wu

[11] Patent Number: 5,593,488
[45] Date of Patent: Jan. 14, 1997

[54] ACID RESISTANT CALCIUM CARBONATE COMPOSITION AND USES THEREFOR

[75] Inventor: Kuan-Ting Wu, Sandersville, Ga.

[73] Assignee: ECC International Inc., Atlanta, Ga.

[21] Appl. No.: 518,652

[22] Filed: Aug. 24, 1995

[51] Int. Cl.[6] .................................................. C09C 1/02
[52] U.S. Cl. .................... 106/464; 106/465; 106/471; 162/181.1; 162/183
[58] Field of Search .................................. 106/400, 401, 106/465, 464, 499, 505, 471; 162/181.1, 181.2, 183; 423/430

[56] References Cited

U.S. PATENT DOCUMENTS

| | | | |
|---|---|---|---|
| 3,704,158 | 11/1972 | Rohan et al. | 106/464 |
| 3,797,610 | 3/1974 | Windle | 106/464 |
| 3,873,336 | 3/1975 | Lambert et al. | 106/464 |
| 4,115,187 | 9/1978 | Davidson . | |
| 4,159,312 | 6/1979 | Shibazaki et al. | 106/464 |
| 4,175,066 | 11/1979 | Shibiazaki et al. | 524/425 |
| 4,219,590 | 8/1980 | Shibazaki et al. | 423/268 |
| 4,242,318 | 12/1980 | Brahm et al. | 106/464 |
| 4,714,603 | 12/1987 | Vanderbeiden . | |
| 4,793,985 | 12/1988 | Price et al. . | |
| 5,043,017 | 8/1991 | Passaretti | 106/401 |
| 5,156,719 | 10/1992 | Passaretti . | |
| 5,266,163 | 11/1993 | Dessauer | 162/181.1 |

*Primary Examiner*—Mark L. Bell
*Assistant Examiner*—Michael Marcheschi
*Attorney, Agent, or Firm*—Klauber & Jackson

[57] ABSTRACT

An improved form of calcium carbonate which is acid resistant to enable its use as a filler material in the making of neutral to weakly acid paper, and a process for producing this acid resistant calcium carbonate is provided. This acid resistant calcium carbonate comprises a mixture of at least about 0.1 percent, based on the dry weight of the calcium carbonate, of a weak base together with at least about 0.1 percent, based on the dry weight of the calcium carbonate, of a weak acid.

23 Claims, 14 Drawing Sheets

GCC - 24 Hours Ageing

Figure 1

Figure 2
GCC - 24 Hours Ageing

Figure 4
Scalenohedral PCC - 24 Hours Ageing

Figure 5
Scalenohedral Precipitated Calcium Carbonate

Figure 6
Scalenohedral Precipitated Calcium Carbonate

Figure 7

Figure 8
2% Sodium Polyacrylate

Figure 13
Scalenohedral Precipitated Calcium Carbonate

Figure 14
Ground Calcium Carbonate

ACID RESISTANT CALCIUM CARBONATE COMPOSITION AND USES THEREFOR

BACKGROUND OF THE INVENTION

This invention relates generally to calcium carbonate for use in papermaking, and related industries, and more particularly to a calcium carbonate having acid resistant properties.

Titanium dioxide and calcined clay have traditionally been utilized as filler materials in the preparation of neutral to weakly acidic paper in order to improve the optical properties, especially the brightness, of the resultant product. These materials, however, especially titanium dioxide, have the disadvantage of being very expensive, resulting in higher manufacturing costs and an uncompetitively priced paper product.

Calcium carbonate, particularly precipitated calcium carbonate, has been used as a filler material in the making of alkaline paper. Such usage results in a paper with enhanced optical properties, without the expense incurred in using titanium oxide fillers, resulting in a much less expensive product. Calcium carbonate, however, cannot generally be used as a filler in acidic paper because it decomposes in an acidic environment. Consequently, there has long been a need to develop a calcium carbonate composition which is acid stabilized and resistant to decomposition at low pH, so that it can be utilized as a filler material in the manufacture of acidic paper, such as groundwood paper, where the use of an alkaline filler would have a negative impact on the final paper properties.

Paper made from mechanical pulps has been traditionally produced under acidic papermaking conditions because of "fiber alkaline darkening" that occurs as pH rises. This means that there is a reduction in brightness of the paper (brightness reversion) when the pH is raised from acid to alkaline in wood-containing systems. Alkaline darkening will occur to some degree in any wood pulps with significant lignin content. The degree of darkening depends on the particular pulps, pH, and water quality. In general, ground calcium carbonate and precipitated calcium carbonate fillers buffer wet end in the 7.5–8.2 pH range. Acid-resistant calcium carbonate compositions thus provide a means for reducing the degree of fiber alkaline darkening and brightness reversion due to their ability to maintain a stabilized pH.

U.S. Pat. No. 5,043,017 discloses and claims an acid-stable calcium carbonate resistant to degradation in a mildly acidic environment which comprises a mixture of a calcium-chelating agent or a conjugate base, and a weak acid, such that calcium carbonate is coated by, and is in equilibrium with, the calcium-chelating agent or conjugate base and the weak acid. Preferred calcium carbonate compositions contain sodium hexametaphosphate and phosphoric acid.

OBJECTS OF THE INVENTION

It is an object of the present invention to provide an acid resistant calcium carbonate composition especially suitable for use in papermaking applications.

It is a further object of the present invention to provide a process for the preparation of the aforesaid calcium carbonate compositions.

A still further object of the present invention is to provide a paper having enhanced optical qualities prepared using the calcium carbonate compositions of the present invention.

SUMMARY OF THE INVENTION

The present invention relates to an improved form of calcium carbonate which is acid resistant to enable its use as a filler material in the making of neutral to weakly acid paper, and a process for producing this acid resistant calcium carbonate. More particularly, this invention concerns an acid resistant calcium carbonate comprising a mixture of at least about 0.1 percent, based on the dry weight of the calcium carbonate, of a weak base together with at least about 0.1 percent, based on the dry weight of the calcium carbonate, of a weak acid, wherein either the weak base or the weak acid is derived from an organic polymeric acid. It has surprisingly been found that the inclusion of the organic, polymeric acid residue, either from the use of a weak base derived from an organic, polymeric acid, or from an organic, polymeric acid itself confers a higher degree of acid resistance for calcium carbonate in the presence of fiber slurry, and a longer term of pH stability than the prior art acid-stabilized calcium carbonate compositions. In an optional embodiment, either the weak acid or weak base may consist of a mixture of a weak acids or bases wherein at least one of the components is derived from an organic, polymeric acid.

DETAILED DESCRIPTION OF THE INVENTION

The improved form of calcium carbonate prepared by the instant invention is acid resistant to enable its use as a filler material in the making of neutral to weakly acid paper. While not wishing to be bound by any particular theory as to the operability of the present invention, it is believed that the acid resistance conferred upon the calcium carbonate compositions of the present invention is a result of the inactivation of the surface of the calcium carbonate by the addition of the weak base and the weak acid.

In the practice of the present invention, the calcium carbonate compositions are rendered acid resistant by the inclusion of at least about 0.1 percent, based on the dry weight of the calcium carbonate, of a weak base together with at least about 0.1 percent, based on the dry weight of the calcium carbonate, of a weak acid wherein either the weak base or the weak acid is derived from an organic polymeric acid. In an optional embodiment, either the weak acid or weak base may consist of a mixture of a weak acids or bases wherein at least one of the components is derived from an organic, polymeric acid.

While not wishing to be bound by any theory, it is believed that the capability of the acid-stabilized calcium carbonate of the present invention to resist dissociation in an acidic environment is due to the polymer adsorption on the surface of the calcium carbonate, absorption of polymer functional groups on the calcium carbonate surface, and the formation of a buffering system between anionic functional groups of the polymer and a weak acid, or the polymeric acid and the weak base. This mechanism of polymer adsorption is distinct from absorption or reaction of the prior art sodium hexametaphosphate on the surface of calcium carbonate. Polymer adsorption can provide a barrier coating on the surface of calcium carbonate which reduces the dissolution reaction of calcium carbonate. On the other hand, the absorption or reaction of sodium hexametaphosphate is limited to the surface of the calcium carbonate.

The weak base utilized in the compositions of the present invention is typically a weak base derived from an organic polymeric acid, and is selected from the group consisting of salts of polyacrylic acid, salts of polymaleic acid, salts of polycarboxylic acid and mixtures thereof. Other non-polymeric weak bases such as triethylene tetraamine, diethylene triamine, o-phenanthroline, salts of acetic acid, salts of oxalic acid, salts of phosphoric acid, salts of metaphosphoric acid, salts of hexametaphosphoric acid, salts of citric acid, salts of boric acid, salts of sulfurous acid, and mixtures thereof can also be used in combination with a weak acid which is derived from an organic polymeric acid. Preferred weak bases are sodium hexametaphosphate, sodium polyacrylate and sodium polymaleate. The amount of the weak base utilized is at least 0.1 percent, based on the dry weight of the calcium carbonate, and is preferably about 1 to about 6 percent, based on the dry weight of calcium carbonate.

The weak acid utilized in the compositions of the present invention is preferably a weak acid selected from the group consisting of phosphoric acid, metaphosphoric acid, hexametaphosphoric acid, ethylenediaminetetraacetic acid (EDTA), citric acid, sulfurous acid, boric acid, acetic acid, and mixtures thereof. Weak acids derived from organic polymeric acids, such as polyacrylic acid, polymaleic acid and polycarboxylic acid, and mixtures thereof are also useful in combination with both non-polymeric and polymeric weak bases in the practice of the invention. The organic polymeric acid (or base derived therefrom) is typically an organic polymer having a weight average molecular weight, $M_w$, in the range of 750–1,000,000, consisting of regularly repeating units or chemically similar units, connected by primary covalent bonds. The amount of the weak acid utilized is at least 0.1 percent, based on the dry weight of the calcium carbonate, and is preferably about 1 to about 8 percent, based on the dry weight of the calcium carbonate.

Preferred combinations of weak bases and weak acids for use in the present invention include sodium hexametaphosphate/polymaleic acid, sodium polyacrylate/phosphoric acid and sodium hexametaphosphate/polyacrylic acid. Where the weak acid or weak base is a mixture, preferred combinations include sodium hexametaphosphate/polyacrylic acid/phosphoric acid and sodium hexametaphosphate/sodium polyacrylate/phosphoric acid combinations.

The calcium carbonate utilized is preferably finely divided and it can be either a precipitated calcium carbonate or a natural ground limestone.

The process for producing this acid resistant calcium carbonate involves first forming a mixture of calcium carbonate with at least about 0.1 percent, based on the dry weight of the calcium carbonate, of the weak base or mixtures thereof to be utilized. Then, at least about 0.1 percent, based on the dry weight of the calcium carbonate, of a weak acid or a mixture thereof is added to this resultant mixture. Finally, the resultant mixture is blended for a sufficiently long period of time to ensure uniform mixing of the ingredients.

The calcium carbonate can be utilized in the above-described process either as a dry powder or an aqueous slurry with up to about 60 percent by weight solids content.

The weak base or bases can be utilized in the instant process either as dry solids or as aqueous solutions. When the calcium carbonate is used in dry powder form, it is preferable to utilize an aqueous solution of the weak base (or bases) in order to facilitate homogeneous mixing. Where a slurry of the calcium carbonate is utilized, the solid form of the weak base (or bases) readily dissolves therein so that an aqueous solution is unnecessary.

The weak acid (or acids) can be utilized in the process of preparation in either a pure concentrated form or as aqueous solutions.

The composition of the present invention can be utilized to improve the optical properties of neutral to weakly acidic paper by its addition to the paper during standard manufacturing processes. Typically, the calcium carbonate composition of the present invention is added to a first paper furnish containing components necessary for making acidic paper to thereby form a second paper furnish. The invention will be further illustrated by the following Examples, which are to be considered illustrative of the invention, and not limited to the precise embodiments shown.

EXAMPLE 1

Ground Calcium Carbonate Composition

Figure 1:
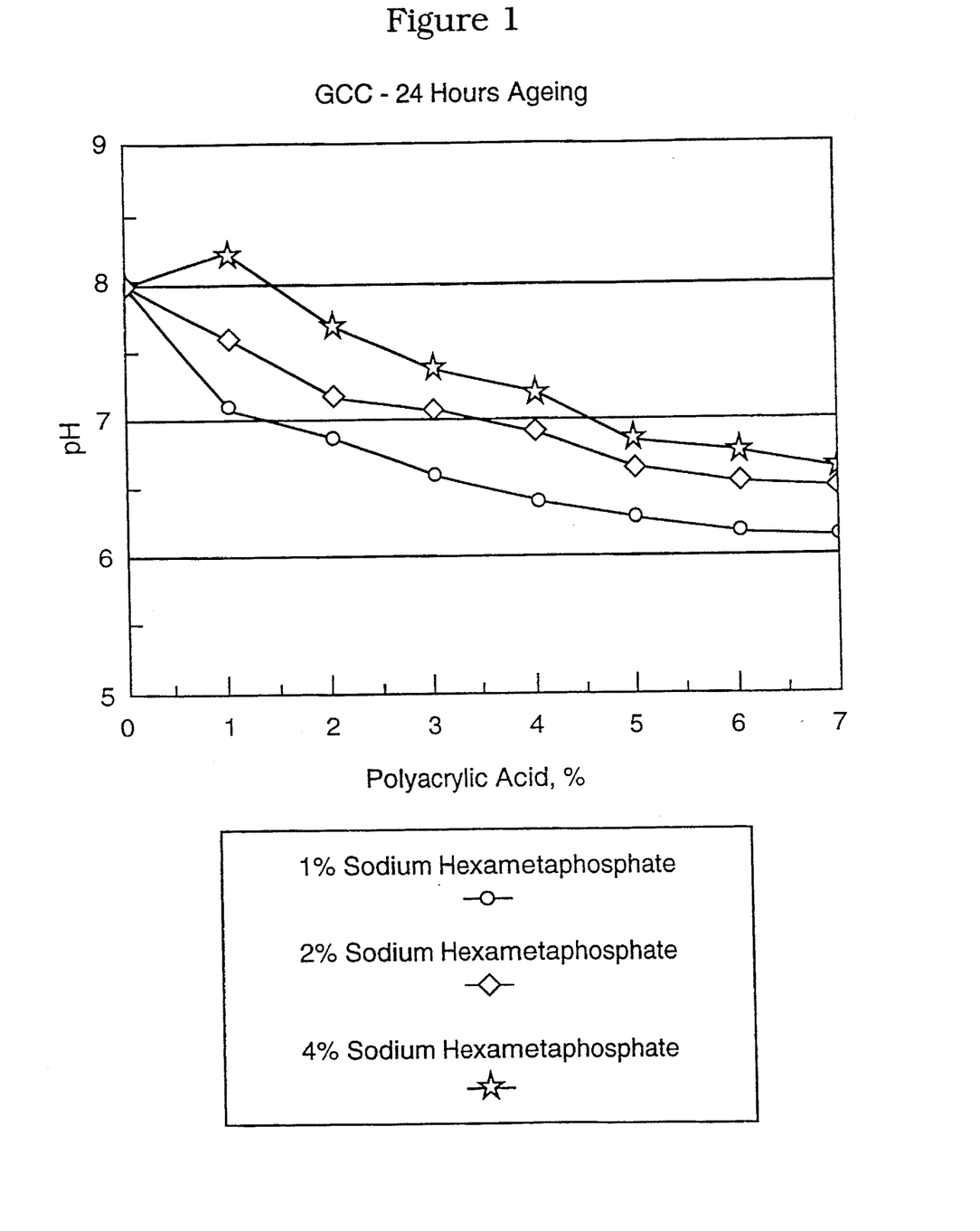
FIG. 1 is a graph showing the 24 hours ageing of ground calcium carbonate compositions of the present invention using various concentrations of sodium hexametaphosphate and polyacrylic acid.
Figure 2:
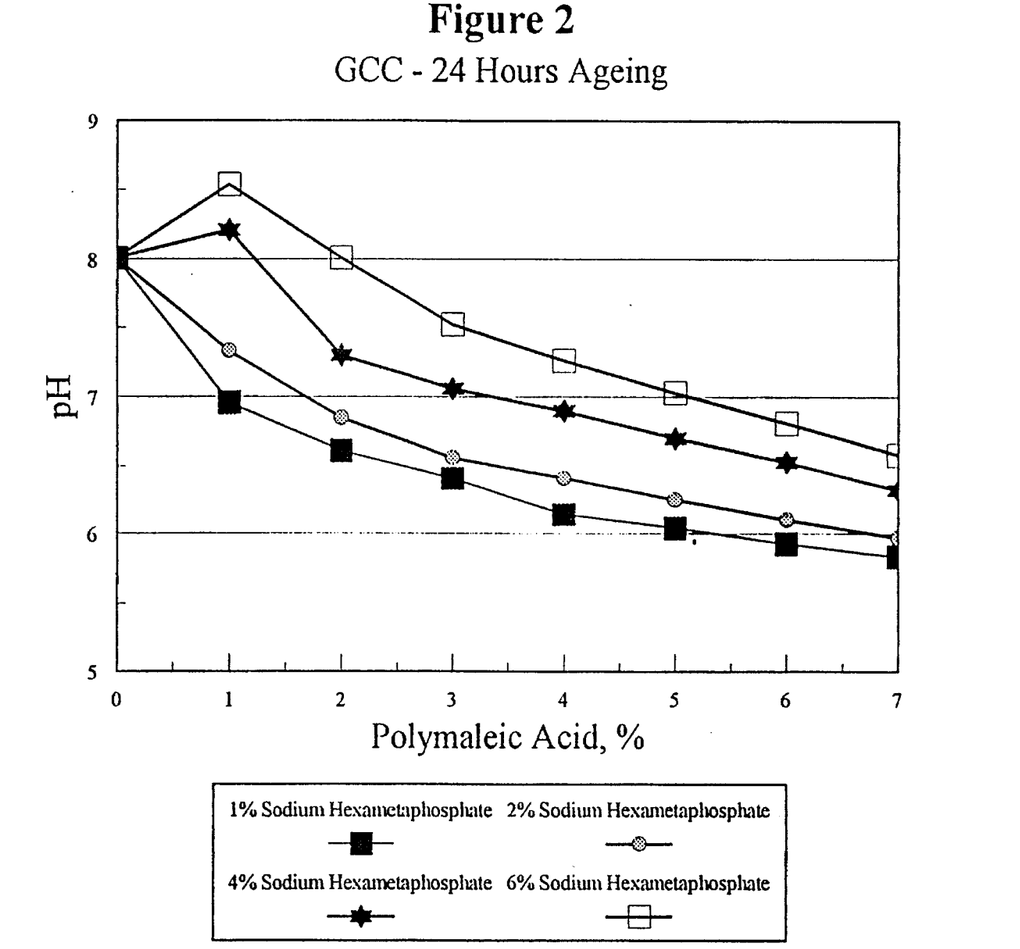
FIG. 2 is a graph showing the 24 hours ageing of ground calcium carbonate compositions of the present invention using various concentrations of sodium hexametaphosphate and polymaleic acid.

Acid resistant ground calcium carbonate slurry can be obtained by the addition of a weak base such as sodium hexametaphosphate, and a weak acid such as polyacrylic acid or polymaleic acid. Initially, 1–6% sodium hexametaphosphate, based on the dry weight of calcium carbonate, was added into 20% solids slurry of ground calcium carbonate which had an initial pH of 8.01. After mixing, 1–6 % polyacrylic acid or polymaleic acid, based on the dry weight of the calcium carbonate, was added. A plot of the pH was measured for each sample after 24 hours ageing, and the graphs are shown in FIG. 1 and FIG. 2. From FIG. 1, the line connecting the oval points indicates that the calcium carbonate slurry prepared from 1% sodium hexametaphosphate, based on the dry weight of calcium carbonate, and 7% polyacrylic acid, based on the dry weight of calcium carbonate, resulted in a product that had a pH of 5.84 after 24 hours ageing.

EXAMPLE 2

Rhombic Precipitated Calcium Carbonate Composition

Figure 3:
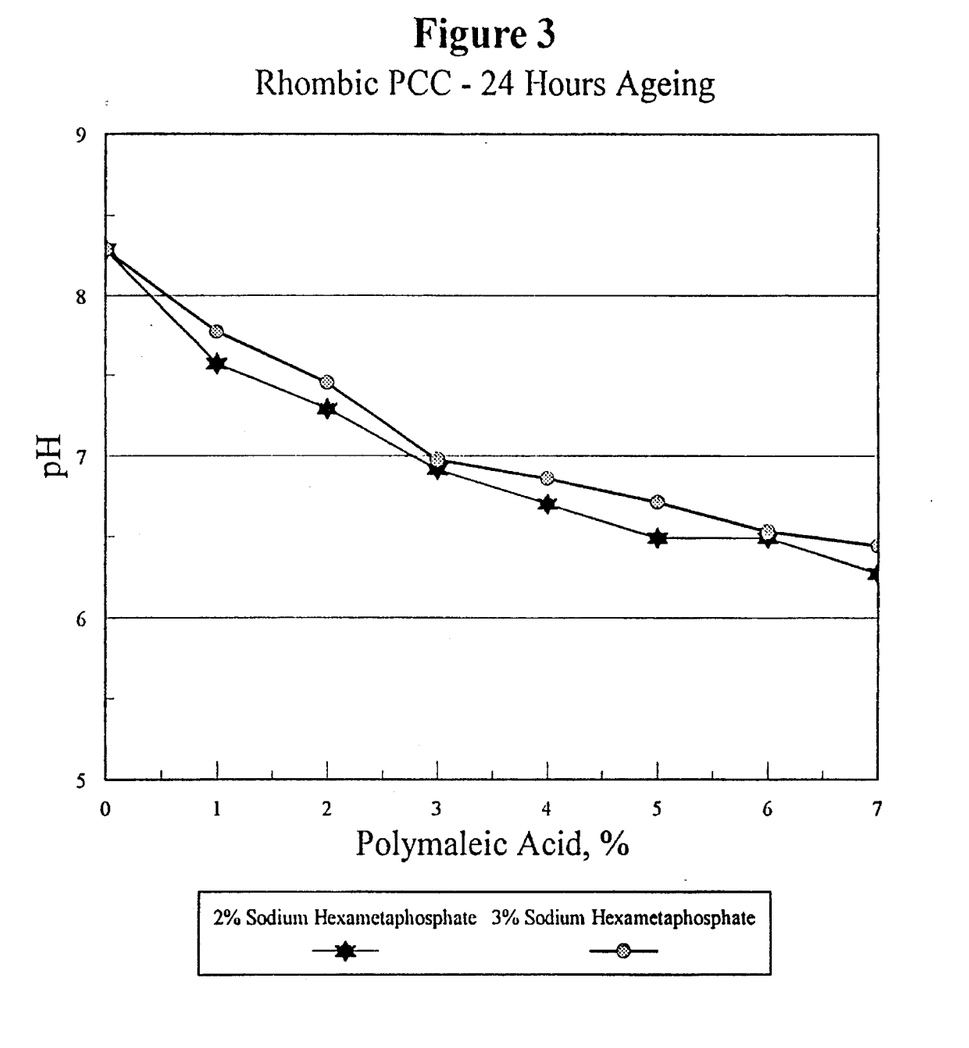
FIG. 3 is a graph showing the 24 hours ageing of rhombic precipitated calcium carbonate compositions of the present invention using various concentrations of sodium hexametaphosphate and polymaleic acid.

The initial pH of rhombic precipitated calcium carbonate was 8.29. To a 17.3% solids slurry of rhombic precipitated calcium carbonate was added 2–3 % sodium hexametaphosphate, based on the dry weight of calcium carbonate. After blending, 1–7 % polymaleic acid, based on the dry weight of calcium carbonate, was added. The pH was measured for each sample and the resultant graph is shown in FIG. 3. The samples having 2% sodium hexametaphosphate had a lower pH at the whole range of the addition of 1–7% polymaleic acid than those containing 3% sodium hexametaphosphate after 24 hours ageing.

EXAMPLE 3

Scalenohedral Precipitated Calcium Carbonate Composition

Figure 4:
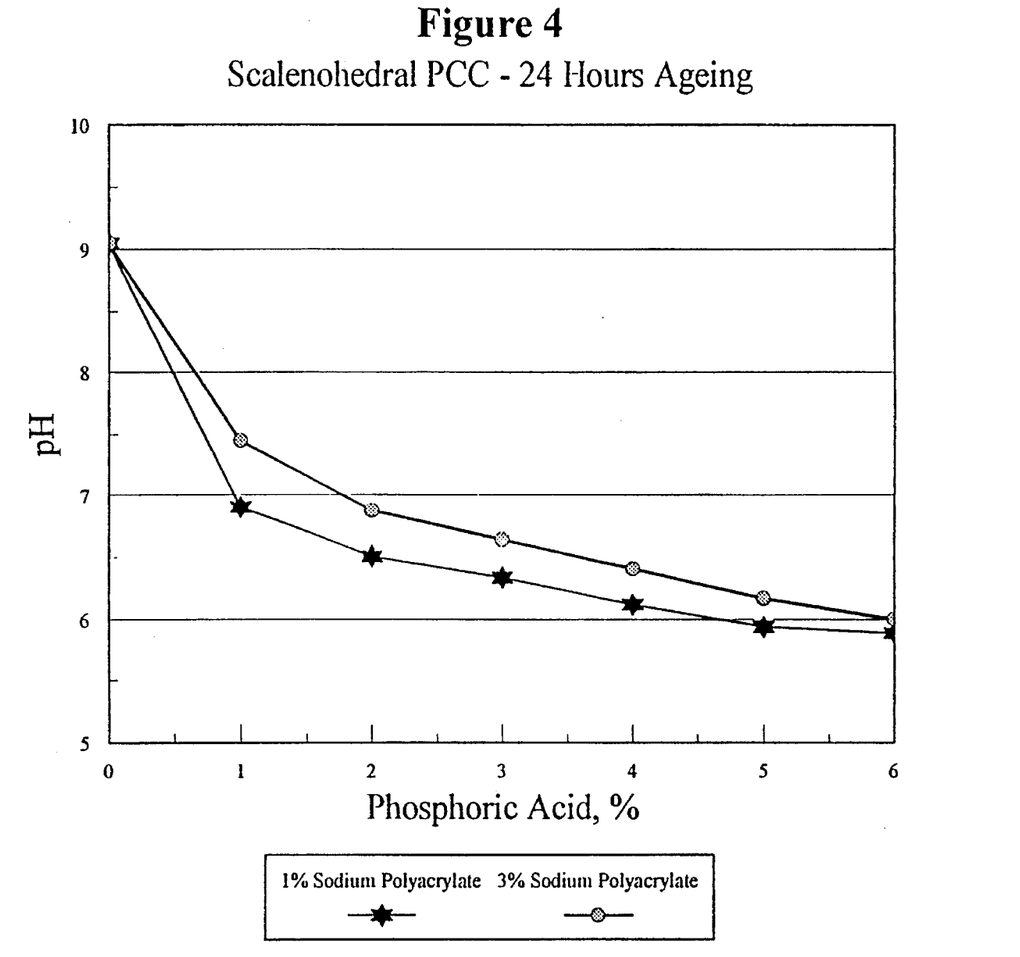
FIG. 4 is a graph showing the 24 hours ageing of scalenohedral precipitated calcium carbonate compositions of the present invention using various concentrations of sodium polyacrylate and phosphoric acid.

Acid resistant scalenohedral precipitated calcium carbonate slurry was prepared by the addition of 1–3 % sodium polyacrylate, based on the dry weight of calcium carbonate, and 1–6 % phosphoric acid, based on the dry weight of calcium carbonate, to a 19.8% solids scalenohedral precipitated calcium carbonate slurry. The initial pH of scalenohedral precipitated calcium carbonate slurry was 9.05. The pH of various samples is shown on the graph of FIG. 4.

EXAMPLE 4

Comparison with Sodium Hexametaphosphate/Phosphoric Acid Buffer Solution

Figure 5:
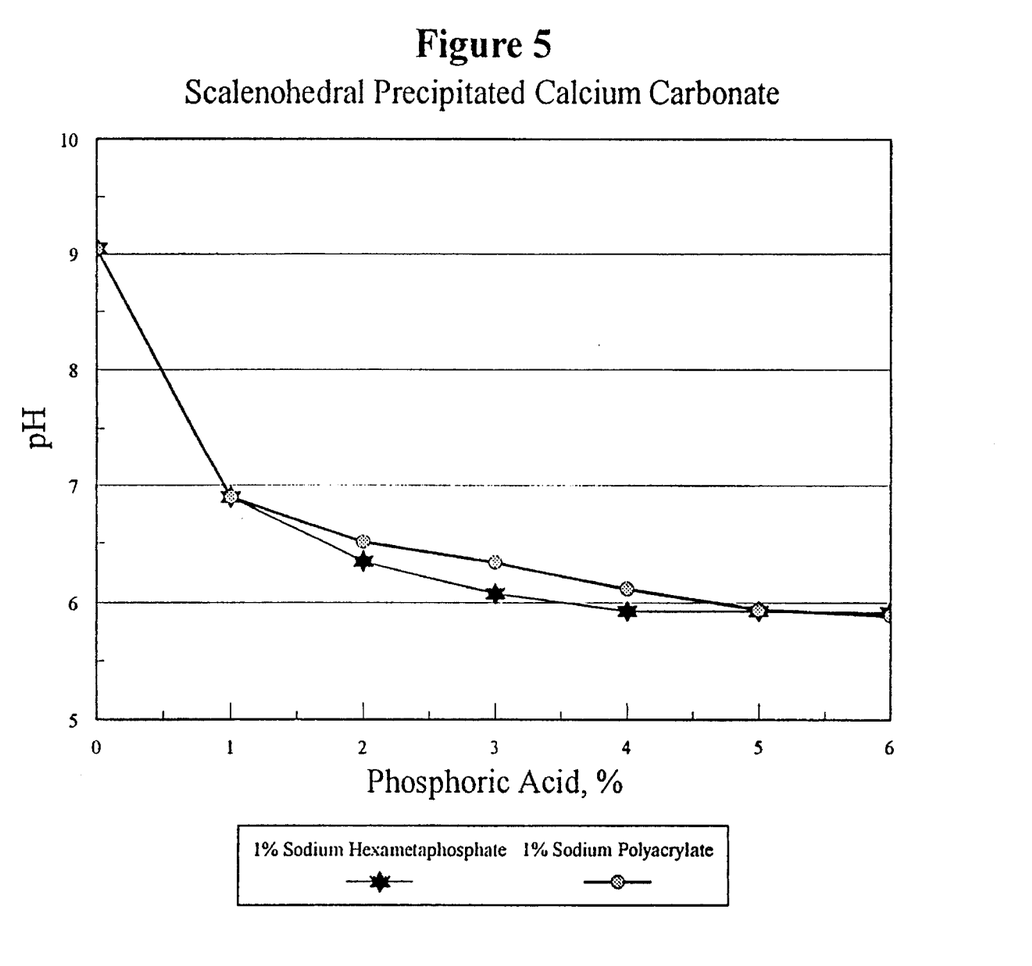
FIG. 5 is a graph comparing the 24 hours ageing of scalenohedral precipitated calcium carbonate compositions containing 1% sodium polyacrylate and 1–6% phosphoric acid of the present invention with compositions of the prior art which utilize a combination of sodium hexametaphosphate and phosphoric acid.
Figure 6:
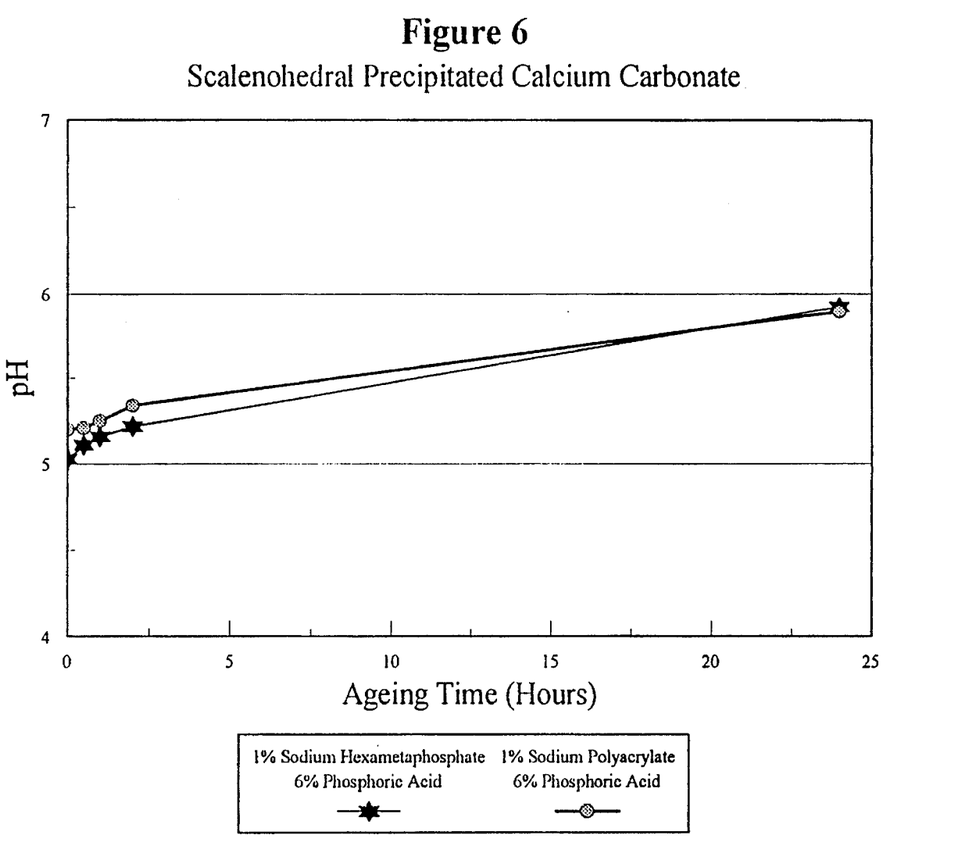
FIG. 6 is a graph comparing the ageing of scalenohedral precipitated calcium carbonate compositions containing 1% sodium polyacrylate and 6% phosphoric acid of the present invention with compositions of the prior art which utilize a combination of sodium hexametaphosphate and phosphoric acid.

A very stable buffer solution was prepared by the combination of sodium hexametaphosphate and phosphoric acid as shown by the disclosure of U.S. Pat. Nos. 5,043,017 and 5,156,719. This was compared to a composition of the present invention containing 1% of a weak base, based on the dry weight of the calcium carbonate, and 1–6% phosphoric acid, based on the dry weight of calcium carbonate, added to a 19.8 % solids scalenohedral precipitated calcium carbonate slurry. FIG. 5 shows similar plots of pH for compositions using the sodium hexametaphosphate and sodium polyacrylate at the same amount of phosphoric acid. A plot of pH change against ageing time is shown in the graph of FIG. 6. This shows similar pH for compositions using 1% sodium hexametaphosphate/6% phosphoric acid (as shown in U.S. Pat. Nos. 5,043,017 and 5,156,719) and a composition of the present invention, i.e., 1% sodium polyacrylate/6% phosphoric acid.

EXAMPLE 5

Polyacrylic acid-stabilized Scalenohedral Precipitated Calcium Carbonate

Figure 7:
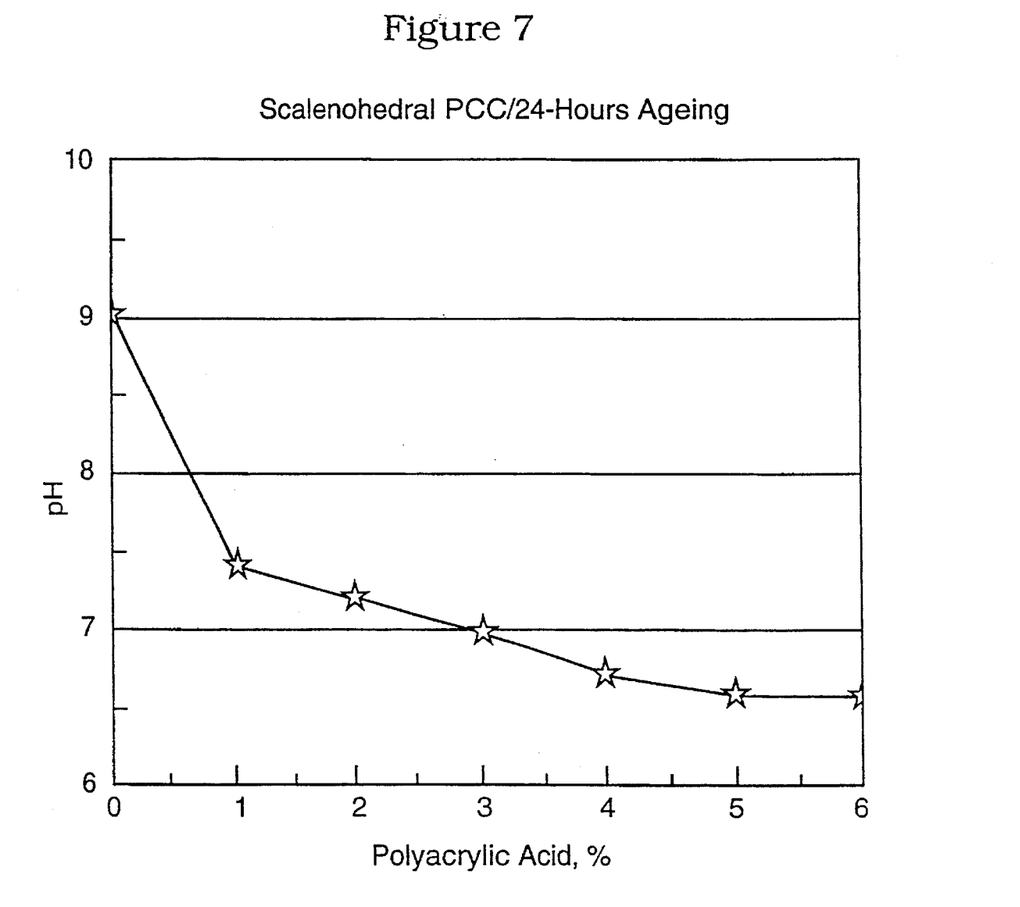
FIG. 7 is a graph comparing the 24 hours ageing of scalenohedral precipitated calcium carbonate compositions containing 1–6% polyacrylic acid.

The initial pH of scalenohedral precipitated calcium carbonate slurry was 9.05. At the beginning, 1–6% polyacrylic acid, based on the dry weight of calcium carbonate, was added to a scalenohedral precipitated calcium carbonate slurry containing 19.8% solids. The pH of the calcium carbonate slurry was below 7 with 3–6% polyacrylic acid treatment after 24 hours ageing. The results are shown graphically in FIG. 7.

EXAMPLE 6

Figure 8:
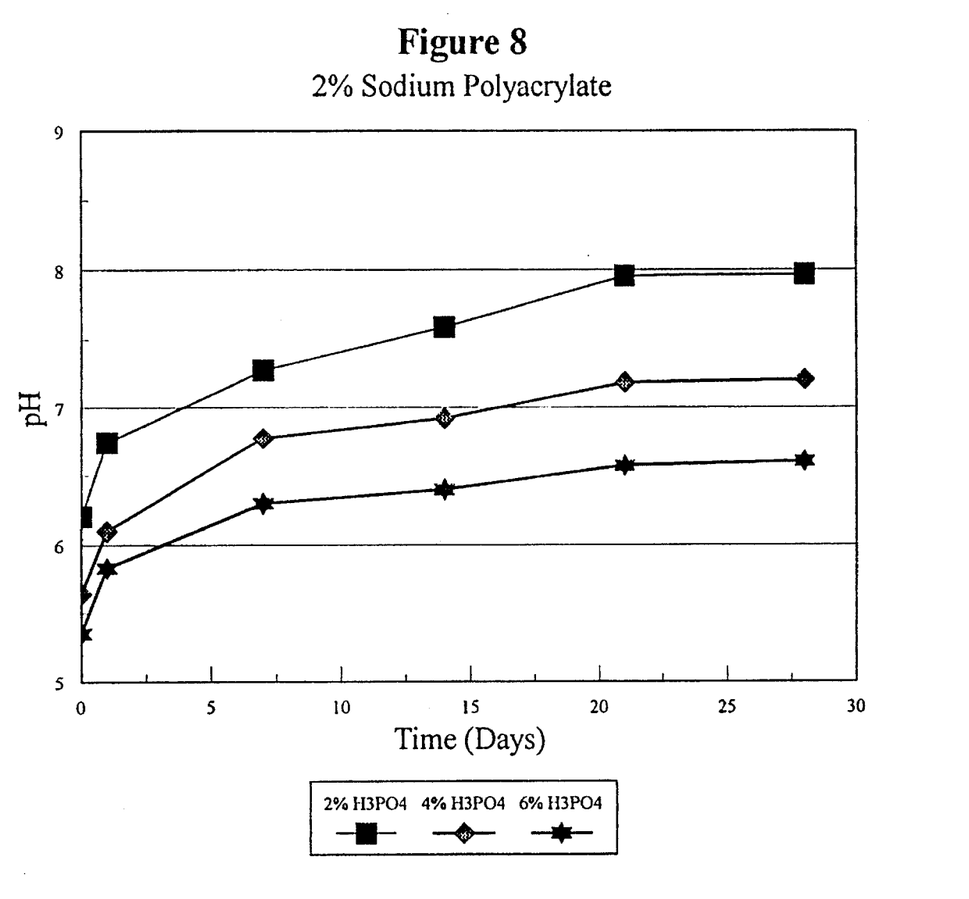
FIG. 8 is a graph comparing the 0–28 day ageing of scalenohedral precipitated calcium carbonate compositions containing 2% sodium polyacrylate and 2–6 % phosphoric acid of the present invention.

Long-term pH stability of Scalenohedral Precipitated Calcium Carbonate Slurry A long-term low pH stabilized scalenohedral precipitated calcium carbonate slurry can be obtained by the combination of sodium polyacrylate and phosphoric acid. The initial pH of scalenohedral precipitated calcium carbonate slurry was 9.05. At the beginning, 2% sodium polyacrylate, based on the dry weight of calcium carbonate, was added to a scalenohedral precipitated calcium carbonate slurring containing 19.8% solids, followed by the addition of 2, 4, and 6% phosphoric acid, based on the dry weight of calcium carbonate, as shown in the graph of FIG. 8. The pHs of scalenohedral precipitated calcium carbonate slurries with 4 and 6% phosphoric acid treatment were below 7 after 15 days ageing. Even after 28 days ageing, the 6% phosphoric acid treated scalenohedral precipitate calcium carbonate slurry had a low pH (pH=6.60).

EXAMPLE 7

Monitoring of pH Change in Paper Making Process

When tested for pH stability in the presence of fiber slurry (0.3% solids, pH=5.88), the rhombic precipitated calcium carbonate compositions of Example 2 were found to exhibit a higher degree of acid resistance after 2–3 days ageing in comparison to calcium carbonate composition prepared according to the prior art as shown in Table 1 below. Initially, 0.11 grams dry treated calcium carbonate was added into 200 ml fiber slurry (0.3% solids), and the mixture was stirred for 1 minute. The pH of the slurry was measured. Then, $1.74 \times 10^{-4}$ gram PERCOL® 175 (a retention aid), was added into the rhombic precipitated calcium carbonate and fiber slurry. After mixing for 1 minute, the pH of the slurry was again measured. According to the results, the initial pH of rhombic precipitated calcium carbonated treated with sodium hexametaphosphate/phosphoric acid (as described in the aforementioned U.S. Pat. No. 5,043,017) was lower than those treated with sodium hexametaphosphate/polymaleic acid. However, after the addition of the treated rhombic precipitated calcium carbonate to the fiber, the pHs of fiber and rhombic precipitated calcium carbonate (treated with sodium hexametaphosphate/polymaleic acid) slurry had a higher degree of acid resistance (lower pH) when compared to those produced with hexametaphosphate/phosphoric acid (as described in the Passaretti patents) after 2–3 days ageing. The same trends were found in compositions with the retention aid (PERCOL® 175).

TABLE 1 pH Effect in Papermaking Process with
Acid-Resistant Rhombic Calcium Carbonates

|  | A<br>⅓<br>Pfizer | B<br>¼<br>Pfizer | C<br>⅓ | D<br>¼ | E<br>⅔ | F<br>¾ |
| --- | --- | --- | --- | --- | --- | --- |
| Rhombic PCC Slurry | 6.23 | 6.05 | 7.13 | 7.12 | 7.18 | 6.72 |
| Fiber Slurry (0.3% Solids) pH = 5.88 | 7.41 | 7.39 | 7.25 | 7.22 | 7.11 | 6.97 |
| Retention Aid (Percol ® 175) | 7.51 | 7.51 | 7.39 | 7.37 | 7.25 | 7.14 |
| Ageing Time (Days) | 3 | 3 | 3 | 3 | 2 | 2 |

**A and B are the ratios of sodium hexametaphosphate/phosphoric acid.
**C, D, E and F are the ratios of sodium hexametaphosphate/polymaleic acid.

EXAMPLE 8

Comparison of Handsheet Performance with Prior Art Compositions

Acid-resistant scalenohedral precipitated calcium carbonate was treated with 2% sodium polyacrylate and 4% phosphoric acid to compare its performance with calcium carbonate treated with 1% sodium hexametaphosphate and 4% phosphoric acid (as described in the Passaretti patents) in handsheet studies. The filler level of scalenohedral precipitated calcium carbonate treated with 2% sodium polyacrylate/4% phosphoric acid was 1.9, 3.1, and 7.2%, based on the dry weight of the fiber, and the filler level of scalenohedral precipitated calcium carbonate treated with 1% sodium hexametaphosphate/4% phosphoric acid (as described in the aforementioned U.S. Pat. No. 5,043,017) was 1.9, 3.7 and 8.9%, based on the dry weight of the fiber.

Figure 9:
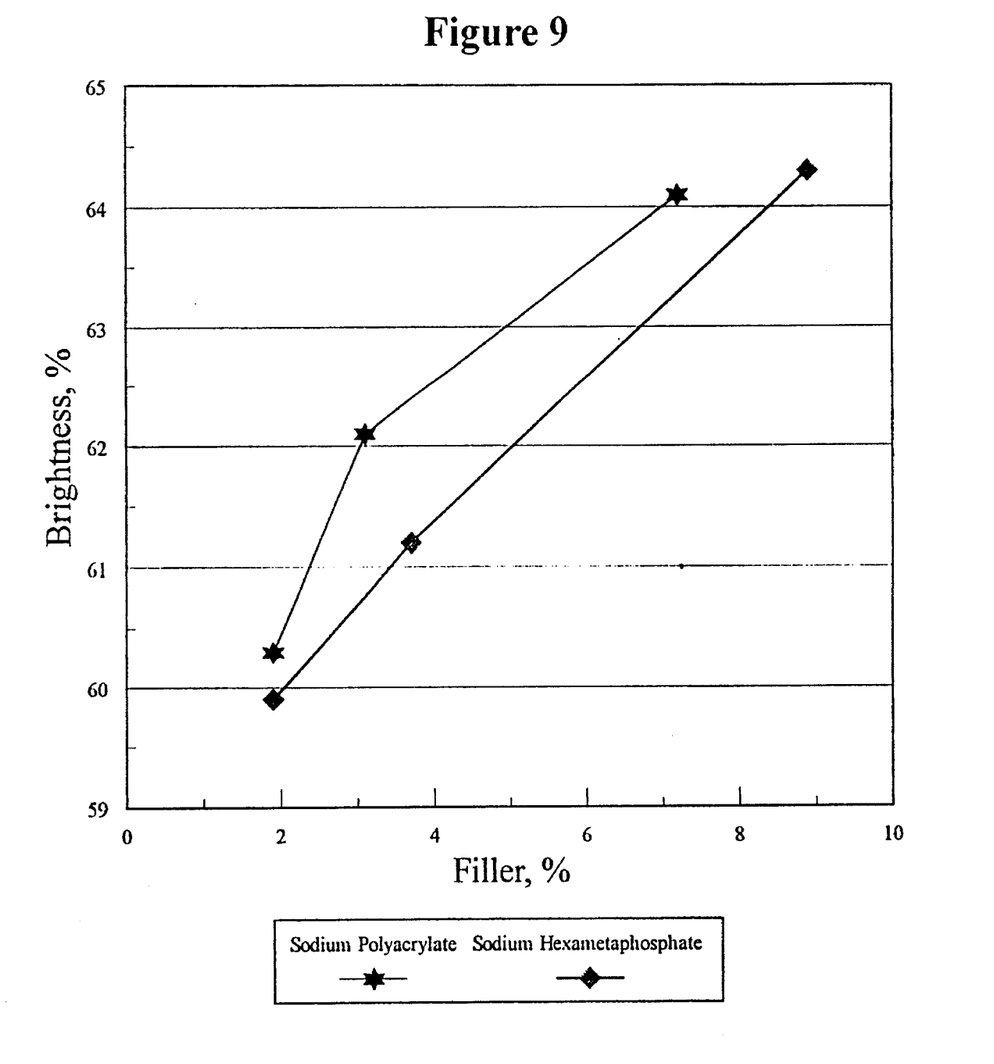
FIG. 9 is a graph comparing the %brightness versus %filler of scalenohedral precipitated calcium carbonate compositions containing 2% sodium polyacrylate and 4% phosphoric acid of the present invention with compositions of the prior art which utilize a combination of 1% sodium hexametaphosphate and 4% phosphoric acid.
Figure 10:
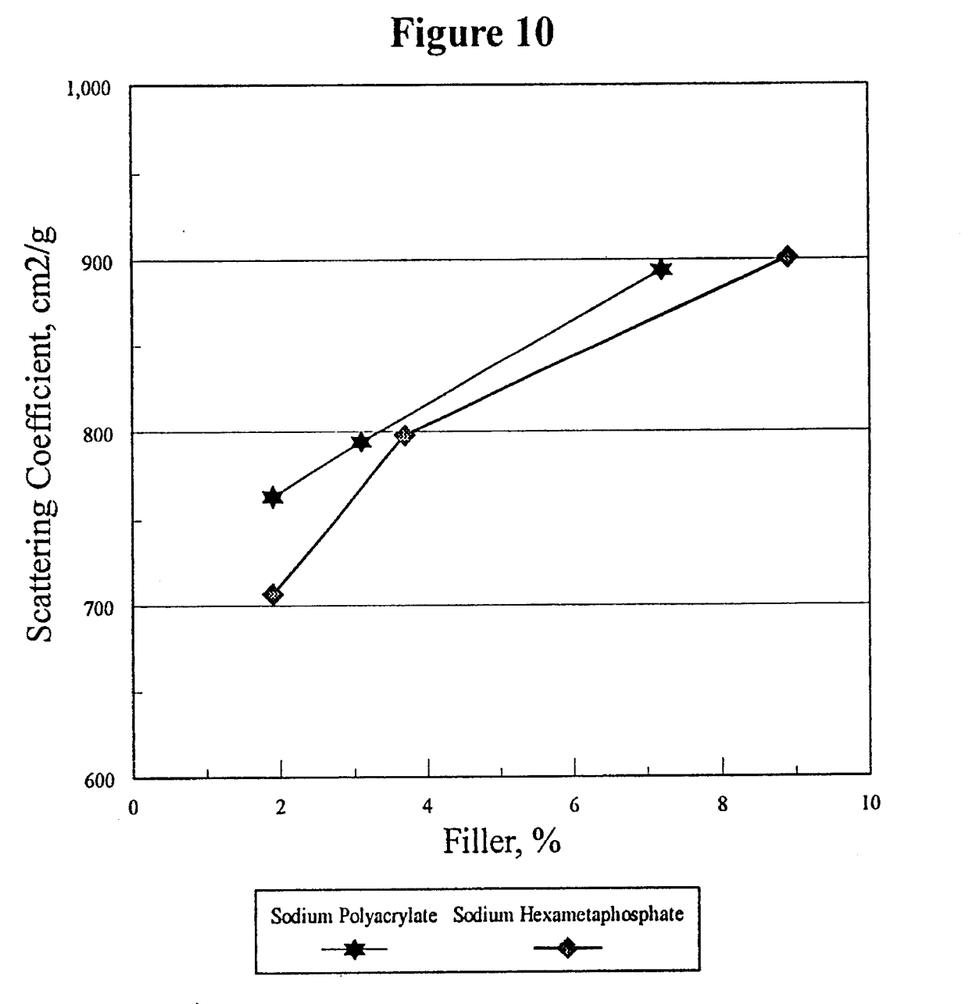
FIG. 10 is a graph comparing the %scattering coefficient versus %filler of scalenohedral precipitated calcium carbonate compositions containing 2% sodium polyacrylate and 4% phosphoric acid of the present invention with compositions of the prior art which utilize a combination of 1% sodium hexametaphosphate and 4% phosphoric acid.
Figure 11:
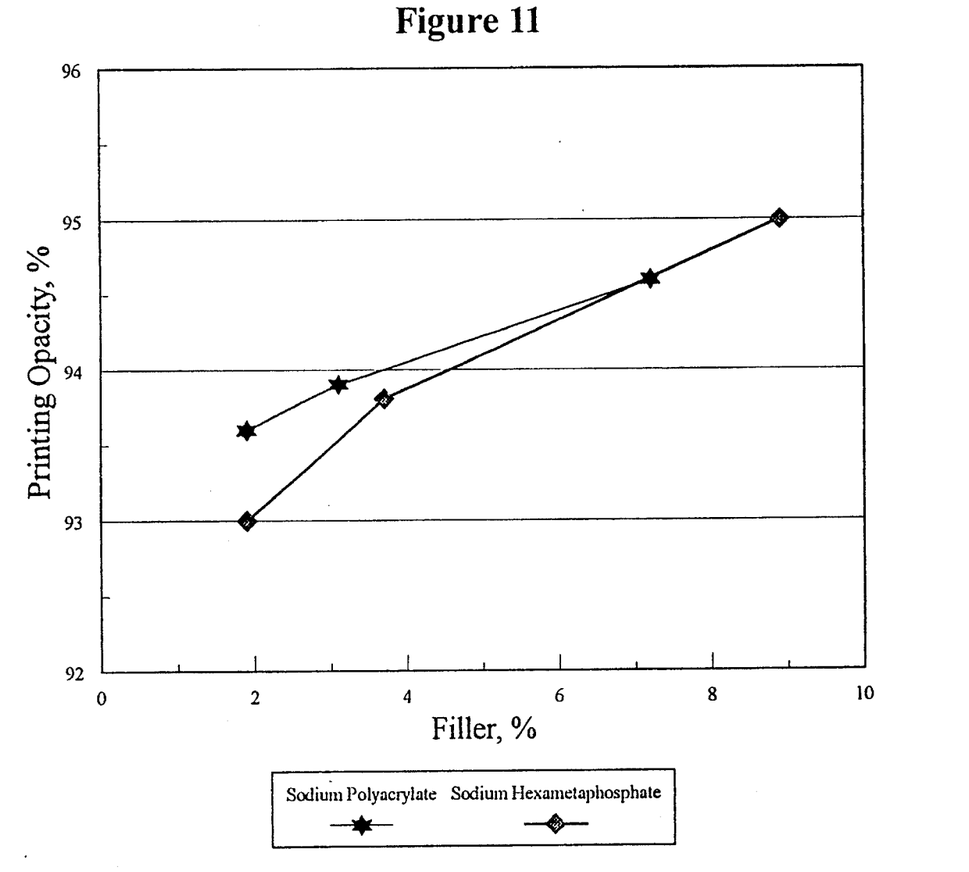
FIG. 11 is a graph comparing the %printing opacity versus %filler of scalenohedral precipitated calcium carbonate compositions containing 2% sodium polyacrylate and 4% phosphoric acid of the present invention with compositions of the prior art which utilize a combination of 1% sodium hexametaphosphate and 4% phosphoric acid.

Brightness, scattering coefficient, and printing opacity of handsheets were plotted against filler level as shown in FIGS. 9, 10, and 11. The brightness and scattering coefficient of handsheets of the present invention were found to be better than those using the '017 formulation at all filler levels. The printing opacity of handsheets treated with the sodium polyacrylate/phosphoric acid was higher at the 2–7% filler levels than those treated with sodium hexametaphosphate/phosphoric acid (as described in the '017 patent).

EXAMPLE 9

Scalenohedral Precipitated Calcium Carbonate

Figure 12:
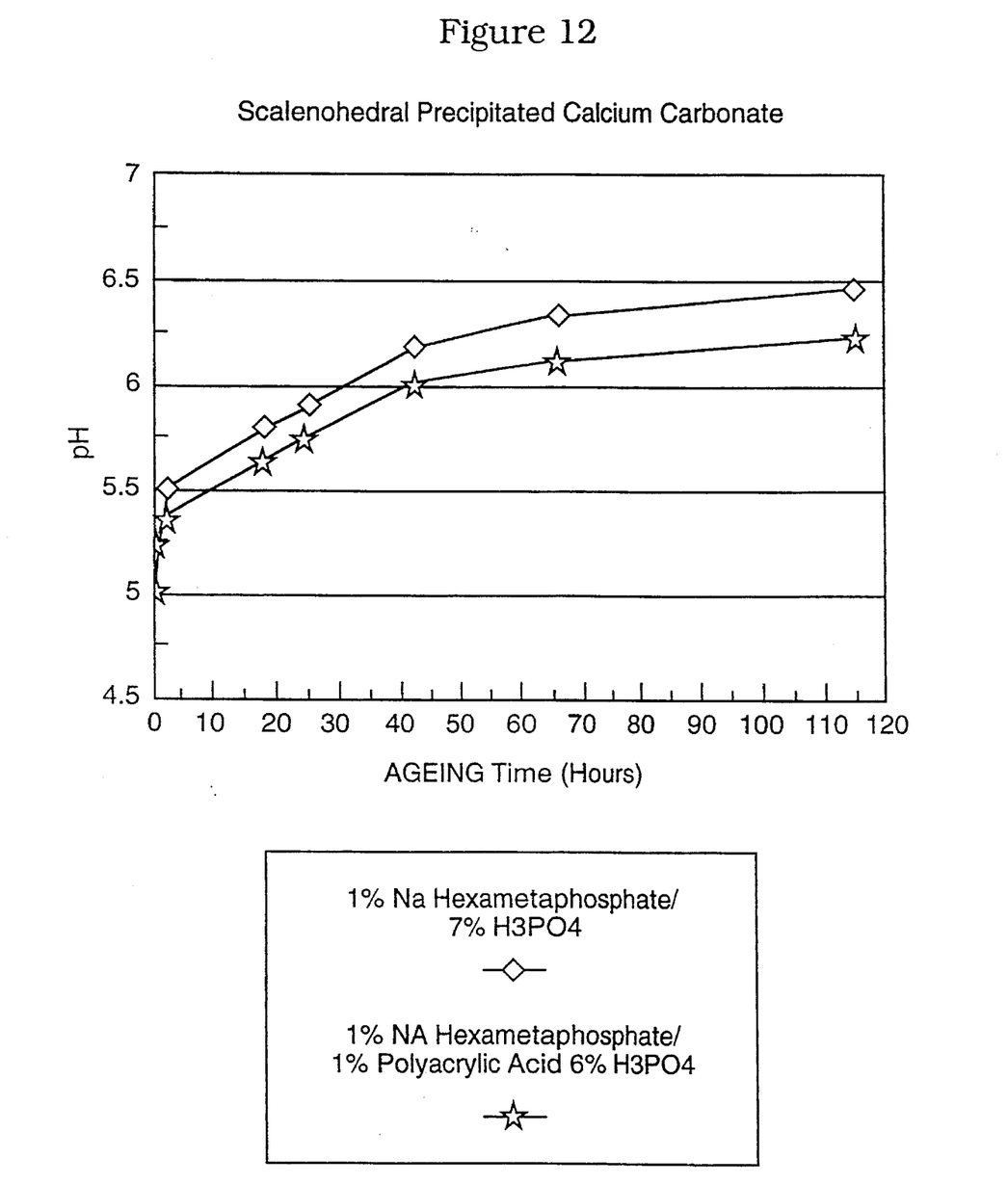
FIG. 12 is a graph comparing the ageing of scalenohedral precipitated calcium carbonate compositions containing 1% sodium hexametaphosphate and a mixture of 1% polyacrylic acid and 6% phosphoric acid of the present invention with compositions of the prior art which utilize a combination of sodium hexametaphosphate and phosphoric acid.

Acid stabilized scalenohedral precipitated calcium carbonate slurry can be obtained by the addition of sodium hexametaphosphate, followed by the addition of two weak acids such as phosphoric acid and a polymeric acid such as polyacrylic acid. Initially, 1% sodium hexametaphosphate, based on the dry weight of calcium carbonate, was added into 19.7% solids slurry of scalenohedral precipitated calcium carbonate. The pH of untreated scalenohedral precipitated calcium carbonate slurry was 9.05. After mixing, 6% phosphoric acid and 1% polyacrylic acid, based on the dry weight of calcium carbonate, were added. A plot of the pH was measured for each sample after 115 hours ageing as shown in FIG. 12. The initial pH of the acid resistant scalenohedral precipitated calcium carbonate slurry was measured and found to be 5.00, ended in a calcium carbonate slurry that had pH-6.24 after 115 hours ageing. To compare with prior art, 1% sodium hexametaphosphate, based on the dry weight of calcium carbonate, was added. After mixing, 7% phosphoric acid, based on the dry weight of calcium carbonate, was added to the calcium carbonate slurry. The initial pH of the slurry was 5.00, and the pH was found to be 6.47 after 115 hours ageing. This pH is thus 0.23 units less than that of the prior art combination of sodium hexametaphosphate and phosphoric acid, giving the composition of the present invention higher acid stability.

EXAMPLE 10

Scalenohedral Precipitated Calcium Carbonate

Figure 13:
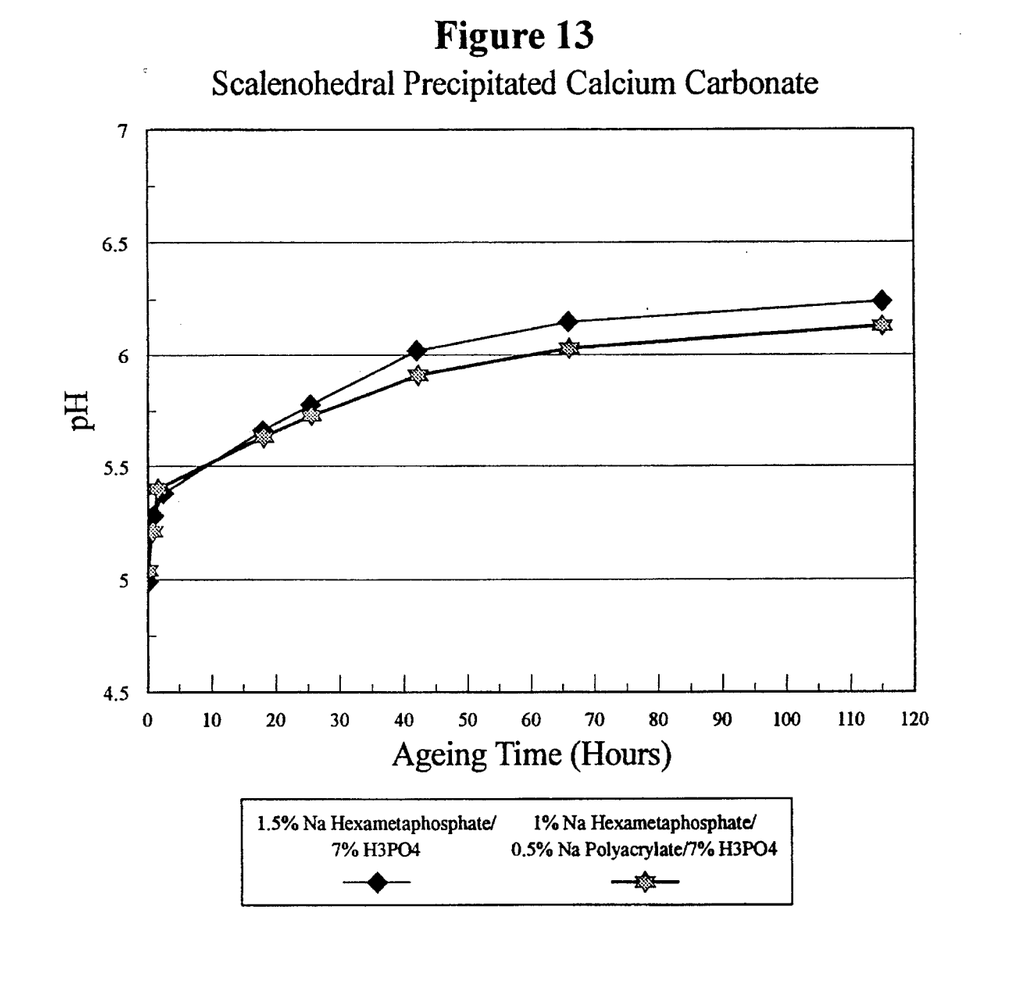
FIG. 13 is a graph comparing the ageing of scalenohedral precipitated calcium carbonate compositions containing a mixture of 1% sodium hexametaphosphate and 0.5% sodium polyacrylate and 7% phosphoric acid of the present invention with compositions of the prior art which utilize a combination of sodium hexametaphosphate and phosphoric acid.

Acid stabilized scalenohedral precipitated calcium carbonate slurry can be obtained by the addition of sodium polyacrylate and sodium hexametaphosphate, followed by the addition of a weak acid such as phosphoric acid. Initially, 0.5% sodium polyacrylate and 1.0% sodium hexametaphosphate, based on the dry weight of calcium carbonate, were added into 19.7% solids slurry of scalenohedral precipitated calcium carbonate. The pH of untreated scalenohedral precipitated calcium carbonate slurry was 9.05. After mixing, 7.0% phosphoric acid, based on the dry weight of calcium carbonate, was added. A plot of the pH was measured for each sample after 115 hours ageing as shown in FIG. 13. The initial pH of the acid resistant scalenohedral precipitated calcium carbonate slurry was measured and found to be 4.99, ended in a calcium carbonate slurry that had pH=6.13 after 115 hours ageing. To compare with prior art, 1.5% sodium hexametaphosphate, based on the dry weight of calcium carbonate, was added. After mixing, 7.0% phosphoric acid, based on the dry weight of calcium carbonate, was added to the calcium carbonate slurry. The initial pH of the slurry was 5.04, and the pH was found to be 6.24 after 115 hours ageing. The pH of this composition is 0.11 unit less than that of the prior art combination of sodium hexametaphosphate and phosphoric acid.

EXAMPLE 11

Ground Calcium Carbonate

Figure 14:
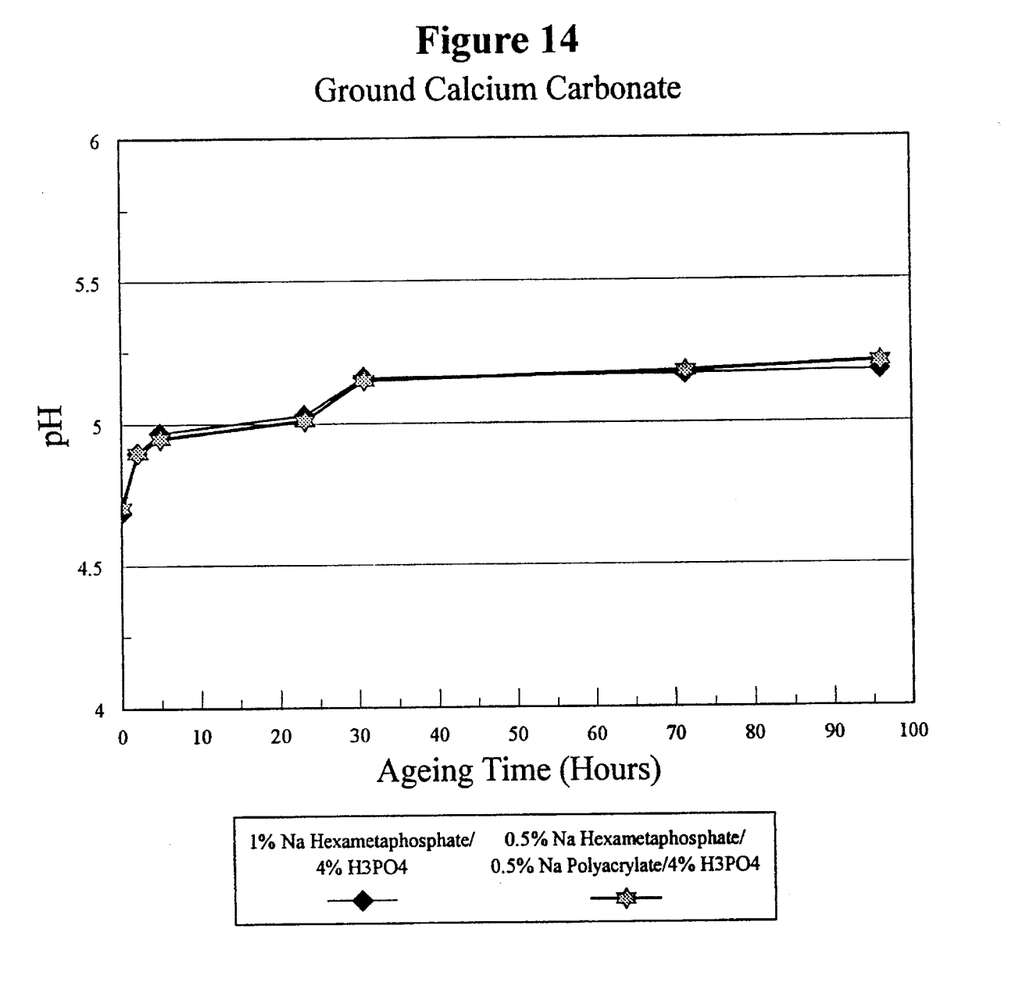
FIG. 14 is a graph comparing the ageing of scalenohedral precipitated calcium carbonate compositions containing a mixture of 0.5% sodium hexametaphosphate and 0.5% sodium polyacrylate and 4% phosphoric acid of the present invention with compositions of the prior art which utilize a combination of sodium hexametaphosphate and phosphoric acid.

Initially, 0.5% sodium polyacrylate and 0.5% sodium hexametaphosphate, based on the dry weight of calcium carbonate, were added into 20.0% solids slurry of ground calcium carbonate. The pH of untreated ground calcium carbonate slurry was 8.01. After mixing, 4.0% phosphoric acid, based on the dry weight of calcium carbonate, was added. A plot of the pH was measured for each sample after 96 hours ageing as shown in FIG. 14. The initial pH of the acid resistant ground calcium carbonate slurry was measured and found to be 4.71 with this invention, ended in a calcium carbonate slurry that had pH-5.21 after 96 hours ageing. To compare with prior art, 1.0% sodium hexametaphosphate, based on the dry weight of calcium carbonate, was added. After mixing, 4.0% phosphoric acid, based on the dry weight of calcium carbonate, was added to the calcium carbonate slurry. The initial pH of the slurry was 4.69, and the pH was found to be 5.18 after 96 hours ageing.

What is claimed is:

1. An acid resistant calcium carbonate composition comprising calcium carbonate in admixture with at least about 0.1 percent, based on the dry weight of the calcium carbonate, of a weak base and at least about 0.1 percent, based on the dry weight of the calcium carbonate, of a weak acid, wherein either the weak base or the weak acid is derived from an organic polymeric acid.

2. The acid resistant calcium carbonate of claim 1 wherein the weak base is selected from the group consisting of sodium hexametaphosphate, sodium polyacrylate, sodium polymaleate, and mixtures thereof.

3. The acid resistant calcium carbonate of claim 1 wherein the weak base is sodium hexametaphosphate.

4. The acid resistant calcium carbonate of claim 1 wherein the weak base is a mixture of sodium hexametaphosphate and sodium polyacrylate.

5. The acid resistant calcium carbonate of claim 1 wherein the weak acid is selected from the group consisting of polyacrylic acid, polymaleic acid, polycarboxylic acid, mixtures thereof, and mixtures with a weak acid selected from the group consisting of phosphoric acid, metaphosphoric acid, hexametaphosphoric acid ethylenediaminetetraacetic acid (EDTA), citric acid, sulfurous acid, boric acid and acetic acid.

6. The acid resistant calcium carbonate of claim 1 wherein the weak acid is polyacrylic acid.

7. The acid resistant calcium carbonate of claim 1 wherein the weak acid is polymaleic acid.

8. The acid resistant calcium carbonate of claim 1 wherein the weak acid is a mixture of polyacrylic acid and phosphoric acid.

9. The acid resistant calcium carbonate of claim 1 wherein the weak base is sodium polyacrylate or sodium polymaleate and the weak acid is phosphoric acid.

10. The acid resistant calcium carbonate of claim 1 wherein the weak base is a mixture of sodium polyacrylate and sodium hexametaphosphate and the weak acid is phosphoric acid.

11. The acid resistant calcium carbonate of claim 1 wherein the weak base is present in an amount of about 1 to about 6 percent, based on the dry weight of the calcium carbonate.

12. The acid resistant calcium carbonate of claim 1 wherein the weak acid is present in an amount of about 1 to about 8 percent, based on the dry weight of the calcium carbonate.

13. A process for the preparation of an acid resistant calcium carbonate which comprises:
    a) forming a mixture of calcium carbonate with at least about 0.1 percent, based on the dry weight of the calcium carbonate, of a weak base;
    b) adding at least about 0.1 percent, based on the dry weight of the calcium carbonate, of a weak acid to the mixture wherein either the weak base or the weak acid is derived from an organic polymeric acid; and
    c) blending the resultant mixture to ensure uniform mixing.

14. The process according to claim 13 wherein the weak base is selected from the group consisting of sodium hexametaphosphate, sodium polyacrylate, sodium polymaleate, and mixtures thereof.

15. The process according to claim 14 wherein the weak base is sodium hexametaphosphate.

16. The process according to claim 14 wherein the weak base is a mixture of sodium hexametaphosphate and sodium polyacrylate.

17. The process according to claim 13 wherein the weak acid is selected from the group consisting of polyacrylic acid, polymaleic acid, polycarboxylic acid, and mixtures thereof, and mixtures with a weak acid selected from the group consisting of phosphoric acid, metaphosphoric acid, hexametaphosphoric acid, ethylenediaminetetraacetic acid (EDTA), citric acid, sulfurous acid, boric acid and acetic acid.

18. The process according to claim 17 wherein the weak acid is polyacrylic acid.

19. The process according to claim 13 wherein the weak acid is a mixture of polyacrylic acid and phosphoric acid.

20. The process according to claim 17 wherein the weak acid is polymaleic acid.

21. The process according to claim 13 wherein the weak base is present in an amount of about 1 to about 6 per cent, based on the dry weight of the calcium carbonate.

22. The process according to claim 13 wherein the weak acid is present in an amount of about 1 to about 8 per cent, based on the dry weight of the calcium carbonate.

23. A method of improving optical properties of neutral to weakly acidic paper by the addition of the composition of claim 1.

* * * * *